United States Patent [19]

Brugerolle et al.

[11] 3,833,477

[45] Sept. 3, 1974

[54] PROCESS AND INSTALLATION FOR THE OXIDATION OF AN OXIDISABLE SUBSTANCE

[75] Inventors: Jean-Renaud Brugerolle, Paris; Pierre Petit, Chatenay, both of France

[73] Assignee: L'Air Liquid, Societe Anonyme Pour l'Etude et l'Exploitation des Procedes Georges Claude, Paris, France

[22] Filed: Aug. 4, 1972

[21] Appl. No.: 278,087

[30] Foreign Application Priority Data

Aug. 10, 1971  France .............................. 71.29152

[52] U.S. Cl. ................. 195/109, 423/220, 195/139, 55/68
[51] Int. Cl. .............................................. C12b 1/00
[58] Field of Search ............ 62/13.29, 41; 195/28 R, 195/109, 104–106, 115, 127, 139–142; 55/68; 423/220, 437, 579

[56] References Cited
UNITED STATES PATENTS

| | | | |
|---|---|---|---|
| 2,993,750 | 7/1961 | Giammarco | 423/220 |
| 3,247,649 | 4/1966 | Miller | 55/68 |

*Primary Examiner*—A. Louis Monacell
*Assistant Examiner*—R. B. Penland
*Attorney, Agent, or Firm*—Young & Thompson

[57] ABSTRACT

In a process for incompletely oxidizing an oxidisable substance, wherein there is obtained after oxidation a residual mixture which is still rich in oxygen and which contains at least one impurity (for example carbon dioxide) the residual mixture being recycled to the inlet of an installation wherein there can be prepared an oxidizing material which is richer in oxygen than the air, for oxidation of the oxidizable substance. The impurity of the residual mixture is thus selectively eliminated in the enrichment installation. The invention can be applied inter alia to the biochemical oxidation of a hydrocarbon, taking place during the aerobic fermentation thereof, for the production of proteins.

26 Claims, 1 Drawing Figure

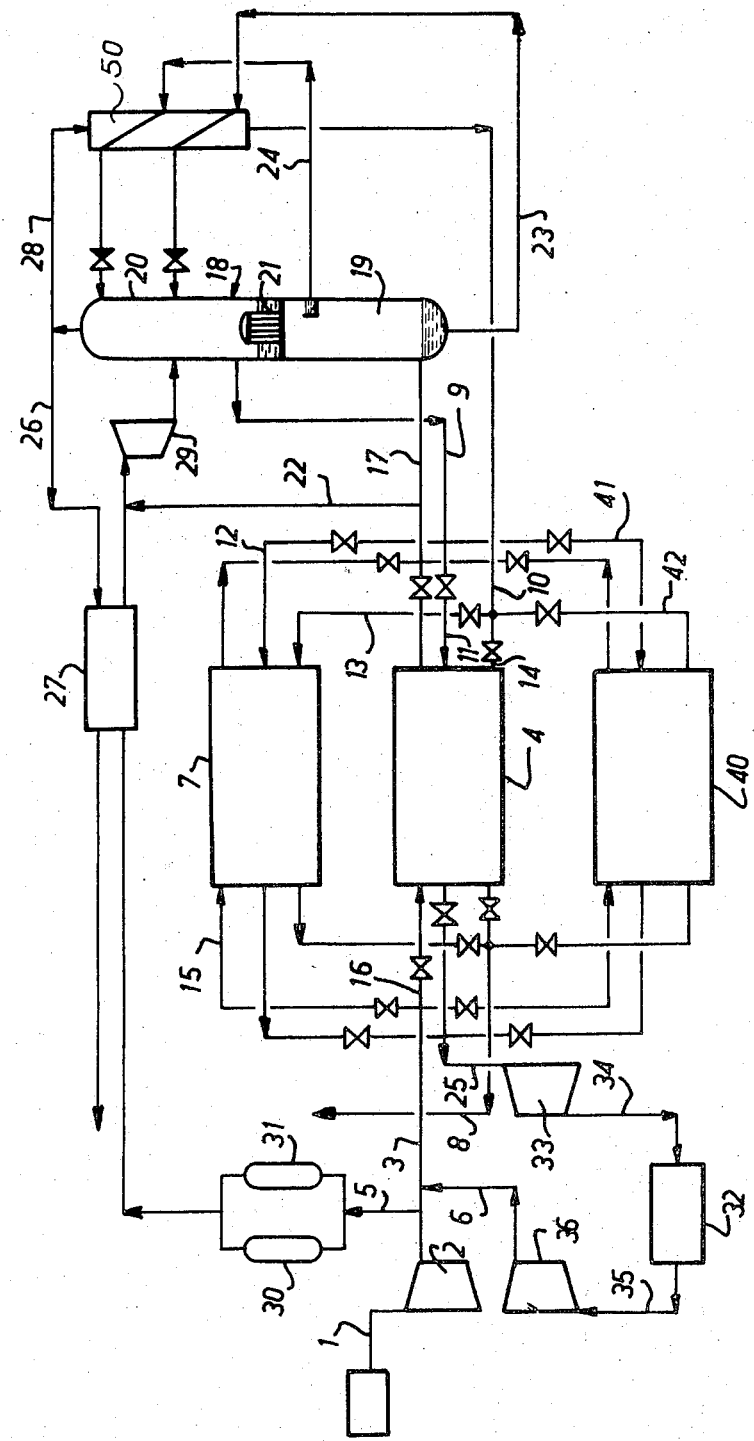

PROCESS AND INSTALLATION FOR THE OXIDATION OF AN OXIDISABLE SUBSTANCE

BACKGROUND OF THE INVENTION

This invention relates to an oxidation process and to an installation for carrying out said process, and more particularly is concerned with oxidations of the biochemical type such as take place during the aerobic fermentation of a hydrocarbon, for example petroleum, in the preparation of proteins.

In numerous industrial oxidation processes in which air can be used to effect the oxidation, in order to increase the specific production of an installation, there is an inducement to enrich the air with oxygen so as to produce and effect oxidation with a material which is richer in oxygen than the ambient air, i.e. oxygen-enriched air or substantially pure oxygen.

When oxidation of the oxidizable substance with the air of the oxidizing material is incomplete, there is necessarily obtained at the outlet of the oxidation reactor a residual mixture comprising oxygen which has not reacted, impurities which are heavier than oxygen and have been produced on oxidation (carbon dioxide for example), and light impurities which are more volatile than oxygen and which existed in the oxidizing material prior to oxidation and have not participated in the atm, and general, these are the inert gases present in air, such as nitrogen or argon). When the residual mixture is richer in oxygen than the air, process economy generally requires that the residual mixture should be recycled to the inlet of the oxidation reactor. It thus becomes necessary to remove from the residual mixture the heavy impurities prior to recycling to the inlet of the oxidation reactor. On the other hand, the recycling circuit is necessarily enriched with inert gases in the course of time. Two procedures can be adopted with a view to obviating this disadvantage. On the one hand, it is possible to purge the recycling circuit periodically; this necessarily involves considerable oxygen losses. On the other hand, it is possible to use as the oxidizing material oxygen in extremely pure form, so as to prevent any noteworthy introduction of inert gases into the recycling circuit; in this case, the corresponding expenditure of energy rapidly becomes prohibitive.

The biochemical oxidation of a hydrocarbon, which takes place during the aerobic fermentation thereof, for the industrial production of proteins, will serve as an illustration of the foregoing remarks. In such a process an oxidizing material (generally air) is injected into a reactor containing a fermentation bath comprising the hydrocarbon. The oxygen is incompletely consumed and there is recovered at the outlet of the reactor a residual mixture comprising oxygen which has not oxidized hydrocarbon, heavy impurities which are less volatile than oxygen and are produced during the oxidation, such as carbon dioxide, and lighter impurities which are more volatile than oxygen, which existed in the oxidizing material before the latter was introduced into the reactor and which have not participated in the oxidation, such as nitrogen and argon. The preparation of proteins by fermentation generally requires very considerable quantities of oxygen; for example, an installation producing 100,000 metric tons per annum consumes approximately 20,000 $Nm^3$ of oxygen per hour. Thus, in order to increase the specific production of a protein manufacturing installation, the inducement is to employ an oxidizing material which is richer in oxygen than the ambient air, i.e. air substantially enriched in oxygen or oxygen which is substantially pure. For example, utilization of pure oxygen enables the production capacity of a reactor to be tripled. If the installation consumes a very considerable quantity of oxygen, there is juxtaposed, in the vicinity of the protein-producing installation, an air enrichment installation for producing an adequate supply of an oxidizing material, i.e. enriched air or substantially pure oxygen. This latter installation may comprise a section permitting the purification, at least partially, of the air entering the installation from at least one heavy constituent which is less volatile than oxygen (decarbonation and/or dehydration) and a section permitting fractionation of the purified air for separating at least partially at least one light constituent of the air which is more volatile than oxygen (nitrogen and/or argon). Since only half the oxygen available in the oxidizing material is consumed by the fermentation, if the residual mixture is richer in oxygen than air the economy of the process thus requires that the residual mixture should be recycled to the reactor inlet. This requires, apart from the purification of the residual mixture from heavy impurities (decarbonation and/or dehydration), that the light impurities which would otherwise be introduced into the recycling circuit by the oxidizing material should be substantially eliminated. Where periodic purges of the recycling circuit are effected, it is necessary to accept the loss of considerable quantities of oxygen; in the case of an oxidizing material comprising 99 percent of oxygen and 1 percent of inert gases, it is necessary to periodically purge, on the recycling circuit, at a rate corresponding to 10 percent of the flow rate of the oxidizing material flowing from the enrichment installation, in order to maintain a recycled residual mixture having an oxygen content substantially equal to 90 percent.

It is an object of the present invention to provide, in a process involving the incomplete oxidization of an oxidisable substance with an oxidising material which is substantially richer in oxygen than ambient air and which produces a residual mixture which is recycled to take part in further oxidation, means permitting the elimination of an impurity which is contained by the residual mixture and which is likely to accumulate, in the course of time, in the recycling circuit.

SUMMARY OF THE INVENTION

The present invention thus provides a process for the oxidization of an oxidizable substance, wherein there is enriched with oxygen a gaseous mixture comprising oxygen, thereby to obtain an oxidizing material, wherein the oxidisable substance is oxidized whilst incompletely consuming the oxidizing material, thereby forming a residual mixture comprising at least one impurity, and wherein, according to the invention, there is combined with at least a portion of the gaseous mixture, before the enrichment thereof, at least a portion of the residual mixture, the said impurity being at least partially eliminated on the said enrichment being effected.

In the process according to the invention, the residual mixture is recycled to the inlet of the enrichment installation. Thus, the invention makes it possible to employ the enrichment installation for separating at least partially the said impurity and for selectively eliminating the latter out of the recycling circuit, without losing any noteworthy quantity of oxygen. With the process of the invention, it thus becomes possible to employ an oxidizing material the oxygen content of which may be, for example, between 95 and 100 percent, whilst dispensing with the periodical purging of the recycling circuit.

Herein the references to "oxygen enrichment of the gaseous mixture comprising oxygen" are to be understood to mean any process permitting the preparation of an oxidizing material which is substantially enriched with oxygen (enriched air, for example) or totally enriched with oxygen (i.e. substantially pure oxygen).

The invention is, of course, not limited to one given type of enrichment. However, what is concerned is generally enrichment by fractionation and, in this case, there is combined with at least a portion of the gaseous mixture, before fractionation thereof, at least a portion of the residual mixture and, simultaneously, on fractionation being effected, there is separated, at least partially, at least one of the constituents of the gaseous mixture other than oxygen and the said impurity is at least partially eliminated. Various methods of fractionating the gaseous mixture may be envisaged. The process employed may, first of all, be a process of fractionation by adsorption, for example the production of enriched air by adsorption. It may alternatively be a process of fractionation by permeation. According to a preferred embodiment of the invention, what is concerned is a process for fractionation by at least partial liquefaction of the gaseous mixture and by rectification of the condensed gaseous mixture.

In general, before fractionating the gaseous mixture for enriching it with oxygen, the inducement is to purify it, at least partially, in respect of at least one other of its constituents other than oxygen. In this case, according to the invention, there is combined with at least a portion of the gaseous mixture, before purification thereof, at least a portion of the residual mixture, and a further impurity is at least partially eliminated from the residual mixture during the said purification. According to the invention, therefore, the residual mixture is recycled to the inlet of the purification installation and, in this case, the invention permits the utilization simultaneously of the fractionation installation and the purification installation of the enrichment, for purifying the residual mixture in respect of one or more of its impurities.

In this case, the invention is of course not limited to a given type of purification. Such purification may be effected by adsorption, absorption, by refrigerating means, etc.. In the latter case, the gaseous mixture entering the enrichment installation passes in contact with a cold surface (metallic "accumulator" mass of a regenerator or metallic wall of a reversible exchanger) on which the constituent of the inflowing gaseous mixture to be purified and the said further impurity of the residual mixture are simultaneously condensed and selectively eliminated.

The invention is also not limited to one type of impurity in the residual mixture. It is applicable to any oxidation process, whatever the nature of such impurities or whatever their origin. The said impurities may be produced during oxidation (carbon dioxide for example). They may be introduced by the gaseous mixture comprising oxygen and continue to be obtained in the oxidizing material produced after enrichment and in the residual mixture after oxidation of the oxidizable substance (inert gases from the air, for example). They may be more volatile than oxygen (nitrogen, argon, etc.), or less volatile than oxygen (carbon dioxide, water, etc.). They may have the same nature as the impurities of the gaseous mixture flowing into the installation, for example in the case of air, carbon dioxide, nitrogen, argon, etc..

The invention is not limited to one type of gaseous mixture comprising oxygen. However, what is concerned is generally atmospheric air. Preferentially, in cases wherein the residual mixture comprises at least one light impurity and one heavy impurity, there will be combined with at least a portion of the air, before purification and fractionation thereof, at least a portion of the residual mixture and, successively, there is eliminated from the mixed air and residual mixture, respectively, at least one heavy constituent, for example carbon dioxide, which is less volatile than oxygen and the said heavy impurity, and the air and the residual mixture, mixed and purified, are fractionated for separating a light constituent of the air (for example nitrogen, argon) which is more volatile than oxygen and the light impurity of the residual mixture (nitrogen, argon for example). Preferably, fractionation of the air is effected by liquefaction and rectification at low temperature. Thus, in this case, the invention makes it possible to achieve the following two supplementary advantages:

On the one hand, when the heavy impurity is carbon dioxide, the process according to the invention promotes purification of the residual mixture by refrigeration means, in reversible exchangers or regenerators operating by heat exchange between the air to which residual mixture has been added and the gaseous, cold products separated during rectification. In fact, since the residual mixture is diluted with air, the overall carbon dioxide content of the air and of the residual mixture (mixed) is substantially diminished relatively to that of the residual mixture. Refrigeration purification, which is impossible for high carbon dioxide contents (due, notably, to the risk of obstruction of the exchangers or regenerators) then becomes possible. For example, for a residual mixture comprising 30 to 50 percent of carbon dioxide, the content thereof may be brought to between 6 and 8 percent by air dilution. This content makes purification by refrigeration methods possible. Thus, the economy of the process is promoted, since refrigeration purification is less costly as to investment and functioning than is purification by adsorption.

On the other hand, when the heavy impurity of the residual mixture is carbon dioxide or water, utilization of the installation for air purification for the elimination of the said impurity from the residual mixture makes it possible to dispense with the independent installation for air purification, otherwise necessary in the recycling circuit.

DESCRIPTION OF THE PREFERRED EMBODIMENTS

The invention will now be illustrated by reference to the accompanying drawing which shows, diagrammatically and by way of example, an installation for the manufacture of proteins by fermentation of petroleum or a petroleum fraction.

Such an installation comprises essentially a first section in which there is produced an oxidizing material which is either air substantially enriched with oxygen or oxygen having a degree of purity at least equal to 95 percent, and a second section in which the oxidizing material is consumed for the manufacture of proteins.

The composition of the mixtures mentioned herein are given in volume percentages, the pressures are given in absolute atmospheres (or atm; 1 atm = 1.013 bar), and the flow rates are given in $Nm^3$ per hour.

In the first section, 132,400 $Nm^3$ of air or an appropriate gaseous mixture containing oxygen, flowing in via a conduit 1, is compressed by the compressor 2 to a pressure of 6 ata. The compressed air is then evacuated through a conduit 3 to a battery of three identical regenerators 4, 7 and 40. At the outlet of the compressor 2, a portion of the compressed air is tapped-off (12,600 $Nm^3$) through a conduit 5 connected to the conduit 3, and then 21,600 $Nm^3$ of a residual mixture comprising 68.1 percent of oxygen, 2.0 percent of nitrogen, 5.0 percent of argon and 24.9 percent of carbon dioxide are combined with the compressed air via the conduit 6 connected to the conduit 3. Precise data will be given hereinbelow with regard to the origin of the residual mixture flowing into the conduit 6 and the treatment undergone by the air taken off via the conduit 5.

The regenerators 4, 7 and 40 each contain a metallic mass (not shown) — for example aluminum "cakes" or discs. A description will be given hereinbelow of a functioning cycle of a regenerator, such as the regenerator 7. At the initial instant $t_0$, the gas circulating in the conduit 3 under a pressure of 6 atm and constituted by the combination of the air flowing out of the compressor 2 and the residual mixture arriving via the conduit 6, is put into contact with the metallic mass of the regenerator 7 via the conduit 15. Between instant $t_0$ and instant $t_1$, the residual mixture and the air are cooled by heat exchange with the metallic mass of the regenerator 4, which has been completely cooled in a preceding cycle; the air and the residual mixture are also purified from carbon dioxide and water by condensation of these impurities on the cold surface of the metallic mass. At instant $t_1$, the air and the residual mixture are fed, for cooling and purification, to the regenerator 4, a "reversal" being effected in respect of conduit 15 and conduit 16. Simultaneously, at instant $t_1$, cold nitrogen (the origin of which will be stated precisely hereinbelow) is supplied, in the direction opposite to that of the inflowing air, through conduit 13 into regenerator 7. Between instant $t_1$ and instant $t_2$, the metallic mass of the regenerator 7 is partially cooled by heat exchange with the cold nitrogen circulating in contact with the metallic mass contained by the said regenerator; at least a portion of the carbon dioxide and water condensed during the preceding phase of the cycle comprised between $t_0$ and $t_1$ is entrained by the flow of nitrogen which is then evacuated and discharged to the atmosphere through the conduit 8. At instant $t_2$, the introduction of nitrogen into the regenerator 7 is interrupted and an oxidizing material, which may be oxygen-enriched air or substantially pure oxygen, the origin of which will be precisely stated hereinbelow, is supplied through the conduit 12, in the direction opposite to that of the inflowing air, into the regenerator 7. Bewteen the instant $t_2$ and instant $t_3$, cooling of the metallic mass of the regenerator 7 is continued by heat exchange with the cold oxygen circulating in contact with the metallic mass contained; the residual portion of the condensed carbon dioxide and water, not entrained during the preceding phase between $t_1$ and $t_2$, is entrained by the flow of oxygen which is then evacuated through the conduit 25. At instant $t_3$, the introduction of oxygen is interrupted and a fresh cycle may then commence in respect of the regenerator 7. The functioning cycles of the regenerators 4 and 7 are identical with that described hereinabove, but that of the regenerator 4 commences at instant $t_1$ and that of regenerator 40 at instant $t_2$. The periodical reversal of the regenerators 4, 7 and 40 necessarily results in a loss of approximately 17,000 $Nm^3$ of gas comprising 6.9 percent of carbon dioxide. 124,400 $Nm^3$ of air and residual mixture combined, purified, and partially condensed by cooling in the regenerators 4, 7, 40, are then evacuated via conduit 17 to a double column 18 comprising a high pressure rectification column 19 and a low pressure rectification column 20, the two columns being superposed and in heat exchange with each other, through the intermediary of a vaporizer condenser 21. Before being introduced into the low pressure column 17, 7950 $Nm^3$ of air and of the purified residual mixture having the following composition:

| | | |
|---|---|---|
| oxygen | : | 31.6% |
| nitrogen | : | 66.6% |
| argon | : | 1.8% | are branched-off through the conduit 22. The purified air and residual mixture are separated in column 19 into a condensed bottom fraction, which is rich in oxygen and is evacuated via the conduit 23, and a top fraction, which is poor in oxygen and is evacuated via the conduit 24. Approximately 63,115 $Nm^3$ of the fraction evacuated via conduit 23 are subcooled in exchanger 50, expanded to a pressure of 1.3 atm, and introduced into the low pressure column at an intermediate point on the latter. 53,335 $Nm^3$ of oxygen-poor fraction, evacuated via the conduit 24, are subcooled in exchanger 50, expanded to a pressure of 1.3 atm and introduced as reflux liquid at the head of the low pressure column 20. At the bottom of the column 20, an oxidizing mixture in condensed state is recovered. The latter is revaporized by heat exchange in the condenser vaporizer 21, with the top fraction obtained from the column 19 during condensation. 42,000 $Nm^3$ of practically pure oxygen comprising 96.0 percent of oxygen, 3.4 percent of argon and 0.6 percent of nitrogen are evacuated from the bottom of the column 20 via the conduit 9. As previously stated, the gaseous oxygen evacuated via the conduit 9 is reheated by passage in contact with the metallic masses of the regenerators 4, 7 and 40, alternatingly through the intermediary of conduits 11, 12 and 41. After being reheated to ambient temperature, it is then evacuated from regenerators 4, 7 and 40 via a conduit 25. Practically pure gaseous nitrogen having the following composition

| | | |
|---|---|---|
| nitrogen | : | 97.3% |
| argon | : | 1% |
| oxygen | : | 1.7% | is evacuated at the top of the column 20 and divided into two portions. A portion comprising 7,624 $Nm^3$ is evacuated via a conduit 26, heated in exchanger 27 and fed to any appropriate point of utilization. A further portion comprising 87,376 $Nm^3$ is supplied via conduit 28 to exchanger 50 where it subcools the liquid fractions of conduits 23 and 24. As previously stated, the said further portion is then supplied via conduit 10, and alternatively by conduits 13, 14 and 42, to the battery of regenerators 4, 7 and 40 where it entrains at least a portion of the condensed impurities of the inflowing air and residual mixture; then, it is evacuated via the conduit 8.

The refrigeration necessary for the enrichment installation producing the oxidizing material is obtained by expansion from the high pressure of 6 atm to the low pressure of 1.3 atm of a portion of the mixture flowing into the fractionation installation, in a turbine 29. For this purpose, 12,600 $Nm^3$ of air are branched-off via the conduit 5, purified from water and carbon dioxide by adsorption in columns 30 and 31 which are periodically reversed, and then cooled in the exchanger 27 in counterflow relative to the nitrogen evacuated via conduit 26. At the outlet of exchanger 27, 7,950 $Nm^3$ of air and residual mixture purified in the regenerators 4, 7 and 40 are added, via conduit 22, to the air cooled in exchanger 27. The two combined streams are then expanded in the turbine 29 to a pressure of 1.3 atm, and then introduced into low pressure column 20, at an intermediate level.

In the second portion of the installation, the 42,000 $Nm^3$ of oxidizing mixture of oxygen produced in the first part of the installation are consumed, to maintain biochemical oxidation taking place during fermentation in a reactor 32 and permitting the production of proteins from an appropriate oxidizable material (petroleum for example). For this purpose, the oxygen flowing in via conduit 25 is compressed by compressor 33 to a pressure higher than 6 atm and, injected through conduit 34 into a fermentation bath contained in the reactor 32. At the outlet of reactor 32, 21,600 $Nm^3$ of a residual mixture having the following composition:

| | | |
|---|---|---|
| oxygen | : | 68.1% |
| nitrogen | : | 2.1% |
| argon | : | 4.9% |
| carbon dioxide | : | 24.9% | are evacuated via a conduit 35 under a pressure lower than 6 atm. Thus, it will be appreciated that only approximately half the initial oxidizing material has been consumed. The residual mixture is then recompressed to 6 atm in the compressor 36 and combined, via the conduit 6, with the air flowing out of the compressor 2.

The invention is not limited to the mode of embodiment described hereinabove. Other variants could be envisaged, without thereby departing from the scope of the invention. For example, it is possible to replace the regenerators described hereinabove by one or more reversible exchangers.

As previously stated, the invention is thus applied to any incomplete oxidation producing impurities which it is necessary to eliminate if it is desired to recycle the residual mixture produced to the oxidation inlet. It is applicable, notably, to any other type of biochemical oxidation reaction, to other fermentations of the aerobic type besides the manufacture of proteins by fermentation. It may also be applied to the biological purification of effluent.

We claim:

1. A process for the oxidation of an oxidizable substance, comprising:

a. separating a gaseous mixture feed stream comprising oxygen into an oxidizing product stream enriched in at least oxygen with respect to said feed stream, and at least a byproduct stream enriched in at least a constituent other than said oxygen, with respect to said product stream, b. oxidizing said oxidizable substance with at least a reacting part of said oxidizing product stream while consuming incompletely the oxygen content of said reacting part, and obtaining thereby a residual gaseous mixture comprising oxygen and at least one impurity separable during the separating step (a), c. combining at least a portion of said residual gaseous mixture with at least a portion of said feed stream, before separating said portion of said feed stream during step (a), d. separating said impurity during the separating step (a), and recovering said impurity within a said byproduct stream.

2. A process according to claim 1, wherein said impurity is separated during the separating step (a) together with said constituent, and said constituent and said impurity are recovered in the same byproduct stream.

3. A process according to claim 1, wherein the separating step (a) is carried out by fractionating said gaseous mixture feed stream.

4. A process according to claim 2, wherein said constituent is identical to said impurity, and the separating step (a) is carried out by purifying at least partially said gaseous mixture feed stream from at least said impurity, thereby to obtain said oxidizing product stream at least partly purified from at least said impurity, with respect to said feed stream, and at least a said byproduct stream substantially enriched in at least said impurity with respect to said feed stream.

5. A process according to claim 3, wherein:

before the separating step (a) by fractionation, said gaseous mixture feed stream is at least partly purified from at least another constituent other than oxygen, heavier than said constituent, thereby to obtain said feed stream at least partly purified from said at least another constituent, and at least a waste product stream substantially enriched in said at least another constituent with respect to said feed stream, during the oxidizing step (b) the obtained residual gaseous mixture comprises another impurity separable during the purifying step of said feed stream, and heavier than the first-mentioned impurity, the combining step (c) is carried out before said gaseous mixture feed stream is at least partly purified from said at least another constituent, said another impurity is separated during the purifying step of said feed stream, and is recovered within a said waste product stream.

6. A process according to claim 5, wherein said gaseous mixture feed stream is atmospheric air, said constituent and said first-mentioned impurity are identical to a light component of air, more volatile than oxygen, and said another constituent and said another impurity are identical to a heavy component of air less volatile than oxygen.

7. A process according to claim 6, wherein the fractionation of the purified air feed stream is carried out by at least partial liquefaction, and rectification at low temperature.

8. A process according to claim 7, wherein the fractionation of the purified air feed stream comprises:

e. at least partially liquefying said purified air feed stream, f. introducing said at least partially liquefied air feed stream into a first rectification zone under a high pressure, and obtaining in said first zone a liquid bottom fraction enriched in oxygen and an overhead fraction improverished in oxygen, g. introducing into a second rectification zone under a low pressure, lower than said high pressure, said liquid bottom fraction and said condensed overhead fraction respectively at an intermediate location and at the top of said second rectification zone, and obtaining in said second zone another liquid bottom fraction and another gaseous overhead fraction; vaporizing said another bottom fraction in said second zone, in heat exchange with said gaseous overhead fraction in the course of condensation in said first zone, and withdrawing from said second zone said vaporized another bottom fraction as said oxidizing product stream; withdrawing from said second zone said another gaseous overhead fraction as a said byproduct stream, h. taking off a portion of said atmospheric air feed stream before combining therewith according to step (c) at least a portion of said residual gaseous mixture; purifying at least partially said taken off portion from at least said heavy component; work-expanding said purified taken off portion from said high pressure to said low pressure, thereby to produce the cold necessary to the air fractionation, and introducing said work-expanded taken-off portion into said second rectification zone.

9. A process according to claim 8, wherein said atmospheric air feed stream is purified from at least a said heavy component, by successively:

passing said feed stream in contact with a cold surface, so as to condense and entrap at least partially at least said heavy component, and passing said oxidizing product stream, before the oxidizing step (c), in contact with said cold surface, so as to vaporize and sweep at least the condensed portion of said heavy component.

10. A process according to claim 1, wherein said oxidation is of biochemical type.

11. A process according to claim 10, wherein said oxidation takes place during an aerobic fermentation.

12. A process according to claim 11, wherein said aerobic fermentation is a fermentation of a hydrocarbon for producing proteins.

13. A process according to claim 2, wherein said impurity of the residual gaseous mixture, and said constituent of the byproduct stream, other than oxygen, are chemically the same.

14. A process according to claim 1, wherein said impurity of the residual gaseous mixture is produced during the oxidizing step (b).

15. A process according to claim 2, wherein said impurity of the residual gaseous mixture pre-exists in said oxidizing product stream, and is not consumed during the oxidizing step (b).

16. Apparatus for the oxidation of an oxidizable substance, comprising:

a. means for separating a gaseous mixture feed stream comprising oxygen into an oxidizing product stream enriched in at least oxygen with respect to said feed stream, and at least a byproduct stream enriched in at least a constituent other than said oxygen, with respect to said product stream, b. means for oxidizing said oxidizable substance with at least a reacting part of said oxidizing product stream while consuming incompletely the oxygen content of said reacting part, thereby to obtain a residual gaseous mixture comprising oxygen and at least one impurity separable in the separating means (a), c. means for combining at least a portion of said residual gaseous mixture with at least a portion of said feed stream, before separating said portion of said feed stream in the separating means (a), whereby said impurity is separated in the separating means (a), and recovered within a said byproduct stream.

17. Apparatus according to claim 16, wherein said separating means (a) are fractionating means for said gaseous mixture feed stream.

18. Apparatus according to claim 16, wherein said separating means (a) are purifying means for purifying at least partially said gaseous mixture from at least said constituent identical to said impurity, so as to obtain said oxidizing product stream at least partly purified from at least said impurity, with respect to said feed stream, and at least a said byproduct stream substantially enriched in at least said impurity with respect to said feed stream.

19. Apparatus according to claim 17, and:

purifying means upstream of said fractionating means (a), for purifying at least partly said gaseous mixture feed stream from at least another constituent other than oxygen, heavier than said constituent, and obtaining said feed stream at least partly purified from said at least another constituent, and at least a waste product stream substantially enriched in said at least another constituent with respect to said feed stream, said combining means (c) being located upstream of said purifying means, whereby another impurity obtained in said residual gaseous mixture, heavier than the first-mentioned impurity, and separable in said purifying means, is separated in the purifying means of said feed stream, and recovered within a said waste product stream.

20. Apparatus according to claim 19, wherein said fractionating means comprises liquefying means for said feed stream, and rectifying means at low temperature for said at least partly liquefied feed stream.

21. Apparatus according to claim 20, 1. said rectifying means comprising a first rectification zone under high pressure comprising introduction means for an at least partially liquefied air feed stream, bottom withdrawing means for a liquid bottom fraction enriched in oxygen, and overhead withdrawing means for a condensed overhead fraction impoverished in oxygen; a second rectification zone under a low pressure, lower than said high pressure, comprising intermediate introduction means connected to said bottom withdrawing means of said first zone, overhead introduction means connected to said overhead withdrawing means of said first zone; means for vaporizing another liquid bottom fraction obtained in said second zone, in heat exchange with said gaseous overhead fraction in the course of condensation in said first zone; withdrawing means from said second zone for said vaporized another bottom fraction as said oxidizing product stream; withdrawing means from said second zone for another gaseous overhead fraction as a said byproduct stream, 2. withdrawing means upstream of said combining means (c), for taking off a portion of said air feed stream before combining therewith at least a portion of said residual gaseous mixture, 3. other purifying means, independent from the purifying means of said feed stream, for purifying said taken-off portion from at least one heavy component, 4. work-expanding means for expanding the purified taken-off portion from said high pressure to said low pressure, thereby to produce the cold necessary to the air fractionation, and 5. introduction means in said second rectification zone for introducing thereinto said expanded taken-off portion.

22. Apparatus according to claim 21, wherein the purifying means for said gaseous mixture feed stream comprise reversible heat exchangers, and wherein at least one passage of the reversible exchangers communicates on one side with at least the withdrawing means of said second rectification zone for said oxidizing product stream, and on the other side with said combining means (c), thereby to evacuate the oxidizing product stream through said passage toward the oxidizing means.

23. An installation for the oxidation of an oxidizable substance comprising:
separating apparatus comprising a feed inlet for a gaseous mixture feed stream comprising oxygen, a product outlet for an oxidizing product stream enriched in at least oxygen with respect to said feed stream, and at least a byproduct outlet for a byproduct stream enriched in at least a constituent other than oxygen, with respect to said product stream,
an oxidation reactor for oxidizing said oxidizable substance with at least a reacting part of said oxidizing product stream while consuming incompletely the oxygen content of said reacting part, comprising a reactor inlet communicating with said product outlet of the separating apparatus, a reactor outlet for obtaining a residual gaseous mixture comprising oxygen and at least one impurity separable in said separating apparatus, said reactor outlet communicating with the feed inlet of said separating apparatus, whereby at least a portion of said residual gaseous mixture is combined with at least a portion of said feed stream, before separating said portion of said feed stream in said separating apparatus, and whereby said impurity is separated in said separating apparatus, and recovered within a said byproduct stream.

24. An installation according to claim 23, wherein said separating apparatus is a fractionation apparatus for said gaseous mixture feed stream, and wherein the reactor outlet is connected to the feed inlet of said fractionation apparatus.

25. An installation according to claim 23, wherein said separating apparatus is a purifying apparatus for purifying at least partially said gaseous mixture feed stream from at least a constituent which is identical to said impurity, said purifying apparatus comprising a feed inlet for said feed stream, a product outlet for said oxidizing product stream at least partly purified from at least said impurity, with respect to said feed stream, and a byproduct outlet for a said byproduct stream substantially enriched in at least said impurity with respect to said feed stream, said reactor outlet being connected to said feed inlet of said purifying apparatus.

26. An installation according to claim 24,
and a purifying apparatus upstream of said fractionating apparatus, for purifying at least partly said gaseous mixture feed stream from at least another constituent other than oxygen, heavier than said constituent, comprising a feed inlet for said feed stream, a product outlet for said feed stream at least partly purified from said at least another constituent, and at least a waste product outlet for a waste product stream substantially enriched in said at least another constituent with respect to said feed stream,
the product outlet of said purifying apparatus communicating with the feed inlet of said fractionating apparatus,
the reactor outlet being connected with the feed inlet of said purifying apparatus, whereby another impurity obtained in said residual gaseous mixture, separable in said purifying means, and heavier than said impurity is separated in the purifying apparatus of said feed stream, and recovered within a said waste product stream.

* * * * *

UNITED STATES PATENT OFFICE
CERTIFICATE OF CORRECTION

Patent No. 3,833,477     Dated September 3, 1974

Inventor(s) Jean-Renaud Brugerolle et al.

It is certified that error appears in the above-identified patent and that said Letters Patent are hereby corrected as shown below:

On the cover sheet [73] "L'Air Liquid" should read -- L'Air Liquide --.

Signed and sealed this 4th day of February 1975.

(SEAL)
Attest:

McCOY M. GIBSON JR.
Attesting Officer

C. MARSHALL DANN
Commissioner of Patents